US008902960B2

(12) United States Patent
Chen et al.

(10) Patent No.: US 8,902,960 B2

(45) Date of Patent: Dec. 2, 2014

(54) EYE DIAGRAM SCAN CIRCUIT AND ASSOCIATED METHOD

(71) Applicants: Global Unichip Corporation, Hsinchu (TW); Taiwan Semiconductor Manufacturing Co., Ltd., Hsin-Chu (TW)

(72) Inventors: Liang-Hung Chen, Hsinchu (TW); Yen-Chung Chen, Sunnyvale, CA (US); Jung-Chi Huang, Changhua County (TW)

(73) Assignees: Global Unichip Corporation, Hsinchu (TW); Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/863,467

(22) Filed: Apr. 16, 2013

(65) Prior Publication Data

US 2013/0272358 A1 Oct. 17, 2013

(30) Foreign Application Priority Data

Apr. 16, 2012 (TW) ............................ 101113516 A

(51) Int. Cl.
*H04B 17/00* (2006.01)
*H04L 1/20* (2006.01)

(52) U.S. Cl.
CPC .................................... *H04L 1/205* (2013.01)
USPC ........... 375/224; 375/316; 375/317; 375/326; 375/340; 375/354; 375/355; 375/371

(58) Field of Classification Search
CPC ....... H04L 1/0061; H04L 1/203; H04L 1/205; H04L 7/033; H04L 7/0334; H04L 7/048
USPC ......... 375/224, 316, 317, 326, 340, 354, 355, 375/371
See application file for complete search history.

(56) References Cited

U.S. PATENT DOCUMENTS 8,081,723 B1 * 12/2011 Ding et al. .................... 375/355
8,451,883 B1 * 5/2013 Ding et al. .................... 375/228
8,744,012 B1 * 6/2014 Ding et al. .................... 375/316
2007/0121759 A1 5/2007 Sonntag et al.
2008/0013609 A1 1/2008 Daxer et al.

OTHER PUBLICATIONS

Taiwan Intellectual Property Office, "Office Action", Jul. 25, 2014.

* cited by examiner

*Primary Examiner* — Leon Flores

(74) *Attorney, Agent, or Firm* — WPAT, PC; Justin King

(57) ABSTRACT

Eye diagram scan circuit and associated method for a receiver circuit, including a level adjust circuit, a phase interpolator and a control module. The receiver circuit provides a first data signal and a primary phase data according to a received signal. The control module provides a phase offset data and a level offset data. The level adjust circuit adjusts a level of the received signal in respond to the level offset data; the phase interpolator triggers according to a sum of the phase offset data and the primary phase data, so a second data signal is provide in response to the level-adjusted received signal. The control module compares the first data signal and the second data signal, and accordingly provides an eye diagram scan result for the phase offset data and the level offset data.

16 Claims, 6 Drawing Sheets

EYE DIAGRAM SCAN CIRCUIT AND ASSOCIATED METHOD

This application claims the benefit of Taiwan Patent Application No. 101113516, filed Apr. 16, 2012, the subject matter of which is incorporated herein by reference.

FIELD OF THE INVENTION

The present invention relates to an eye diagram scan circuit and associated method, and more particularly, to a built-in, highly automated eye diagram scan circuit and associated method capable of tracking triggering of data signal in real time to reduce jitter-induced degrade of eye diagram scanning.

BACKGROUND OF THE INVENTION

Chip (die, integrated circuit) is one of the most import hardware foundations of modern electronic devices. For different chips to interchange information (including data, messages and commands, etc) following a same interface standard, a chip includes a transmitter circuit which is coupled to an associated receiver circuit of another chip via circuit board and/or transmission line(s). The transmitter circuit carries information in electric signal which is then sent to the receiver circuit; as the receiver circuit receives the signal, the receiver circuit retrieves the carried information from the received signal. For example, Ethernet network, optical fiber network, XAUI (10 Gigabit Media Independent Interface), PCI-E (Peripheral Component Interconnect Express) and SATA (Serial Advanced Technology Attachment) are commonly adopted interface standards of modern high-speed chip.

To ensure that receiver circuit can correctly retrieve information from the received signal, interface standard includes specifications which should be satisfied by receiver circuit, such as sensitivity to voltage level of the received signal, etc. By monitoring eye diagram of signal receiving of a receiver circuit, one can not only find whether the receiver circuit satisfies the specifications, but also reveal further behavior information of the receiver circuit, such as whether parameters of the receiver circuit are properly set. Therefore, correctly monitoring eye diagram of receiver circuit has become a key point of modern chip design.

An eye diagram of a receiver circuit extends along two axes of time and level (e.g., voltage level). For a received signal of a certain level, if a receiver circuit correctly retrieves information from the received signal by sampling based on a triggering of a certain phase (associated with a triggering time), the level and the triggering time are included into an eye range. On the other hand, if a certain level and a certain triggering time (phase) are not covered by the eye range, it means that the receiver circuit can not correctly retrieve information from a received signal of the level by sampling the received signal based on a phase associated with the triggering time.

In a prior art, monitoring eye diagram for a receiver circuit of a chip is achieved by using a test equipment to send a test signal to the receiver circuit, and manually adjusting the level and the triggering time (phase) of the received signal of the receiver circuit; information accordingly retrieved from the received signal is hence outputted by a transmitter circuit of the chip, and is compared with the original information embedded in the test signal to check if the two match. By systematically changing level and triggering time (phase) of the received signal of the receiver circuit, testing staff scans to obtain the eye diagram of the receiver circuit.

However, the prior art suffers from low degree of automation, consumes considerable human resource and hardware cost, and requires a longer duration to scan eye diagram. While comparing the original information and the retrieved information obtained based on a given level and a given triggering time (phase), a statistically meaningful eye diagram scan result for the given level and the given triggering time is preferably obtained by repeatedly comparing multiple contents of the original information and the retrieved information during the given level and the given triggering timing are constantly maintained. Nevertheless, owing to low automation of the prior art, such repetition of comparison has to be manually monitored by the testing staff, and consequently costs more human/hardware resources.

Besides, while outputting the retrieved information of the receiver circuit, signal receiving and recovery operations of the receiver circuit are not correctly reflected. As modern interface standard adopts embedded clock, information and associated clock are carried in a same signal; hence, when a receiver circuit receives a signal, it performs clock and data recovery (CDR) to recover the clock associated with the original information from the received signal, and then retrieves information by sampling the received signal based on the recovered clock. Unavoidably, the clock recovered from the received signal suffers from jitters (i.e., disturbances of clock period); thus, jitter characteristics are considered as one kind of performance for evaluating a receiver circuit. However, when the retrieved information of the receiver circuit is outputted based on the recovered clock of the receiver circuit, the outputted signal additionally suffers from jitters again, thus fails to correctly reflect actual operation of the receiver circuit, and hence degrades correctness of eye diagram scan.

SUMMARY OF THE INVENTION

To address issues of the prior art, an objective of the invention is providing an eye diagram scan circuit for a receiver circuit. Said receiver circuit provides a first data signal and a primary phase data in response to a received signal, said primary phase data is associated with a data timing of said first data signal. Said eye diagram scan circuit is arranged to provide a plurality of eye diagram scan results for synthesizing an eye diagram, and includes a control module, a phase interpolator, a level adjust circuit and an access circuit, e.g., a de-serializer. Said control module provides a phase offset data and a level offset data. Said phase interpolator is coupled to said control module and said receiver circuit for providing an offset timing in response to said phase offset data and said primary phase data. Said level adjust circuit is coupled to said received signal and said control module for adjusting a level of said received signal in response to said level offset data. Said access circuit is coupled to said phase interpolator and said level adjust circuit for providing (retrieving) a second data signal in response to said level-adjusted received signal based on triggering of said offset timing. Said control module further provides a said eye diagram scan result for said phase offset data and said level offset data by comparing said first data signal and said second data signal.

In an embodiment, said first data signal includes a plurality of first data, said second data signal includes a plurality of second data, and said control module provides an eye diagram scan result for a phase offset data and a level offset data by automatically repeating a predetermined number of comparisons to compare a predetermined number of said first data and said second data when said level offset data and said phase offset data remain unchanged. For example, if each first data and corresponding second data match for each of said predetermined number of comparisons, said control module records said eye diagram scan result as a successful access. On the other hand, if any one of said comparisons finds a mismatch between a first data and a second data, said control module remarks said eye diagram scan result as a failed access.

In an embodiment, each first data includes a first number of bits, each second data includes a second number of bits, and said control module provides said eye diagram scan result by comparing two groups of a third number of bits respectively selected from a first data and a second data. The first number can be greater than the second number, and the third number can be equal to the second number. For example, each first data can be a data of 8 bits, each second data can be of 4 bits; during each comparison, 4 even (or odd) bits of a first data is selected to be compared with 4 bits of a corresponding second data. In a comparison, if a third number (e.g., 4) of bits of a first data and a corresponding second data are equal, the first data and the second data are considered to be matched. On the other hand, if any of a third number of bits of a first data does not equal a corresponding one of a third number of bits of a corresponding second data, said first data and second data are considered to be mismatched.

In an embodiment, after said control module provides an eye diagram scan result for a level offset data and a phase offset data, said control module further updates said phase offset data while keeping said level offset data unchanged, such that said phase interpolator updates said offset timing in response to said updated phase offset data, and said control module further provides another eye diagram scan result for said level offset data and said updated phase offset data.

In an embodiment, while keeping said level offset data unchanged, said control module updates said phase offset data sequentially from a first phase offset value to a second phase offset value at a phase offset separation, so as to provide multiple eye diagram scan results for multiple values of said phase offset data and a same value of said level offset data. After said control module updates said phase offset data to said second phase offset value and provides an eye diagram scan result for said updated phase offset data, said control module further updates said level offset data, so as to repeatedly update said phase offset data from said first phase offset value to said second phase offset value for said updated level offset data, and hence provide multiple eye diagram scan results for multiple values of said phase offset data and an updated value of said level offset data.

In an embodiment, said control module includes a register for registering multiple eye diagram scan results for a same value of said level offset data and different values of said phase offset data.

Another objective of the invention is providing a method arranged to scan an eye diagram for a receiver circuit which provides a first data signal and a primary phase data in response to a received signal, and the method includes: providing a phase offset data and a level offset data, providing an offset timing in response to said phase offset data and said primary phase data, adjusting a level of said received signal in response to said level offset data, providing a second data signal in response to said level-adjusted received signal based on triggering of said offset timing, and providing an eye diagram scan result for said phase offset data and said level offset data by comparing said first data signal and said second data signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
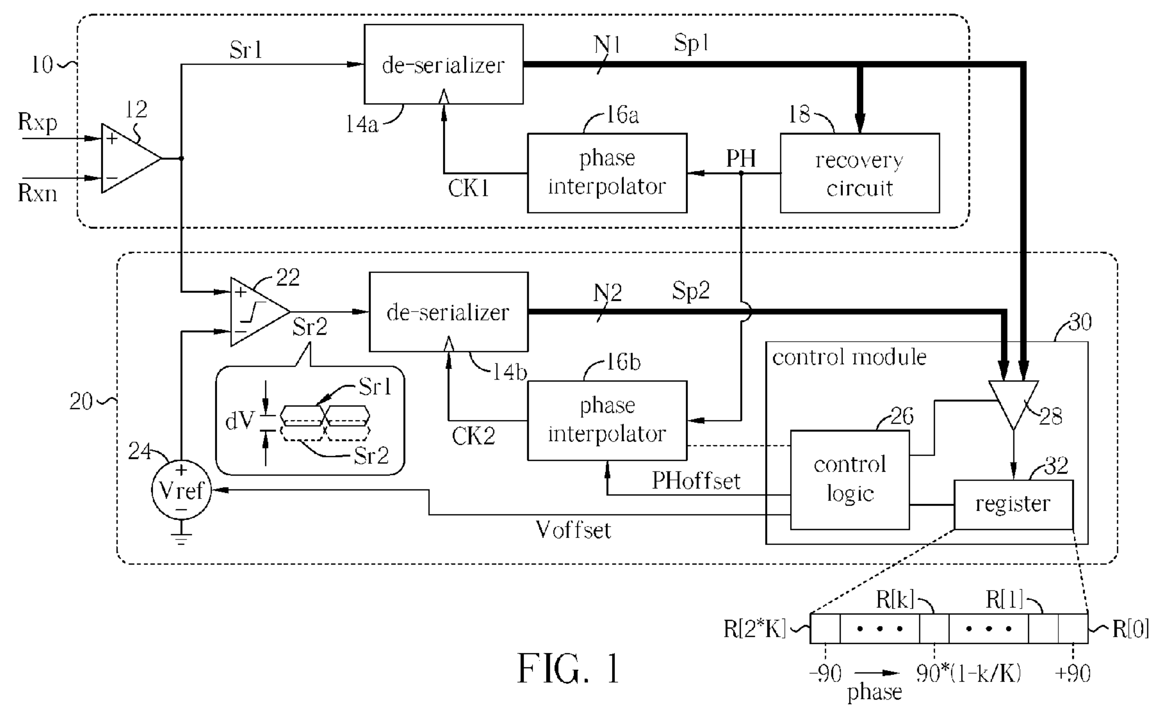
FIG. 1 illustrates an eye diagram scan circuit for a receiver circuit according to an embodiment of the invention.

Please refer to FIG. 1 illustrating an eye diagram scan circuit 20 for a receiver circuit 10 according to an embodiment of the invention. The receiver circuit 10 includes a signal circuit 12, a de-serializer 14*a*, a phase interpolator 16*a* and a recovery circuit 18. The eye diagram scan circuit 20 includes a level adjust circuit 22, a voltage source 24, a de-serializer 14*b*, a phase interpolator 16*b* and a control module 30. In an embodiment, the control module 30 includes a register 32, a comparison module 28 and a control logic 26.

In the receiver circuit 10, the signal circuit 12 is coupled to the de-serializer 14*a*, the recovery circuit 18 is coupled between the de-serializer 14*a* and the phase interpolator 16*a*, and the phase interpolator 16*a* is further coupled to the de-serializer 14*a*. The signal circuit 12 receives a differential pair of signals Rxp and Rxn, which are sent by a transmitter circuit (not shown), as a received signal Sr1. Based on triggering of a timing (e.g., a clock) CK1, the de-serializer 14*a* samples, latches and de-serialize the serial received signal Sr1 to form a parallel data signal Sp1 of N1 bits. The recovery circuit 18 performs clock and data recovery to recover a primary phase data PH from the data signal Sp1, wherein the primary phase data PH is associated with data timing of the data signal Sp1; in response to the primary phase data PH, the timing CK1 is provided by the phase interpolator 16*a*.

In the eye diagram scan circuit 20, the level adjust circuit 22 is coupled between the received signal Sr1, the voltage source 24 and the de-serializer 14*b*, and the de-serializer 14*b* is further coupled to the control module 30. The phase interpolator 16*b* is coupled between the primary phase data PH, the control module 30 and the de-serializer 14*b*. The voltage source 24 is further coupled to the control module 30.

To monitor eye diagram of the receiver circuit 10, the control module 30 provides a phase offset data PHoffset and a level offset data Voffset. The voltage source 24 provides a reference voltage Vref to the level adjust circuit 22 in response to the level offset data Voffset, and the level adjust circuit 22 adjusts level of the received signal Sr1 according to the reference voltage Vref to provide a level-adjusted received signal Sr2. After level adjustment, the received signals Sr1 and Sr2 are different by a voltage difference dV, whose amount is controlled by the level offset data Voffset.

In response to a sum of the phase offset data PHoffset and the primary phase data PH of the receiver circuit 10, the phase interpolator 16*b* provides a timing CK2 (i.e., an offset timing). Base on triggering of the timing CK2, the de-serializer 14*b* functions as an access circuit to obtain a parallel data signal Sp2 of N2 bits from the serial received signal Sr2.

In an embodiment, the de-serializers 14*a* and 14*b* are matched replicas of each other, but the bit number N2 of the data signal Sp2 can be less than the bit number N1 of the data signal Sp1. For example, the data signal Sp1 can be a parallel signal of 8 bits (N1=8), but the data signal Sp2 can be a parallel signal of 4 bits (N2=4); the de-serializer 14*b* can retrieve a parallel signal of N1 bits from the received signal Sr2, and selects N2 odd (or even) bits from the parallel signal to form the parallel data signal Sp2 of N2 bits. Taking the de-serializer 14*a* as an example, common structure of the de-serializers 14*a* and 14*b* is described as follows: the de-serializer 14*a* can include a shift register (not shown), so every consecutive N1 bits of the received signal Sr1 are collected to become a parallel data of N1 bits in the data signal Sp1, and timing (e.g., clock rate) of the data signal Sp1 is 1/N1 of timing of the received signal Sr1.

Figure 2:
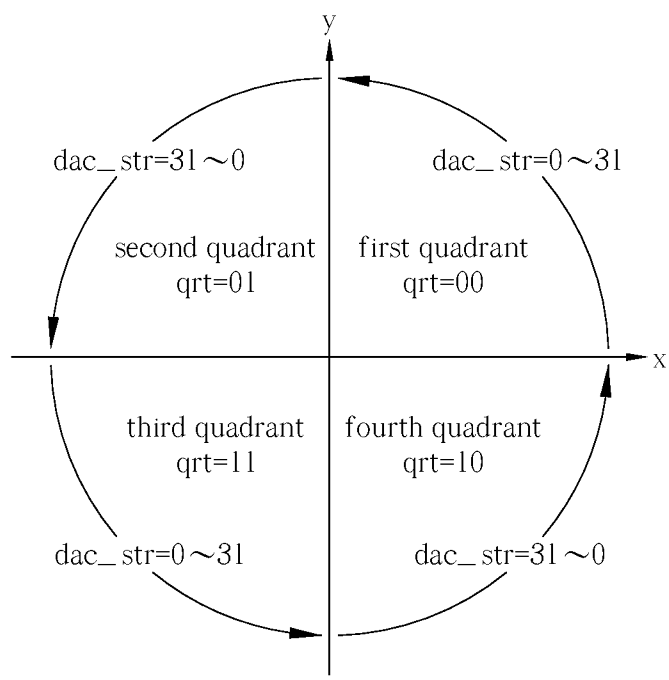
FIG. 2 illustrates an embodiment of phase information for the phase interpolators of FIG. 1.
Figure 3:
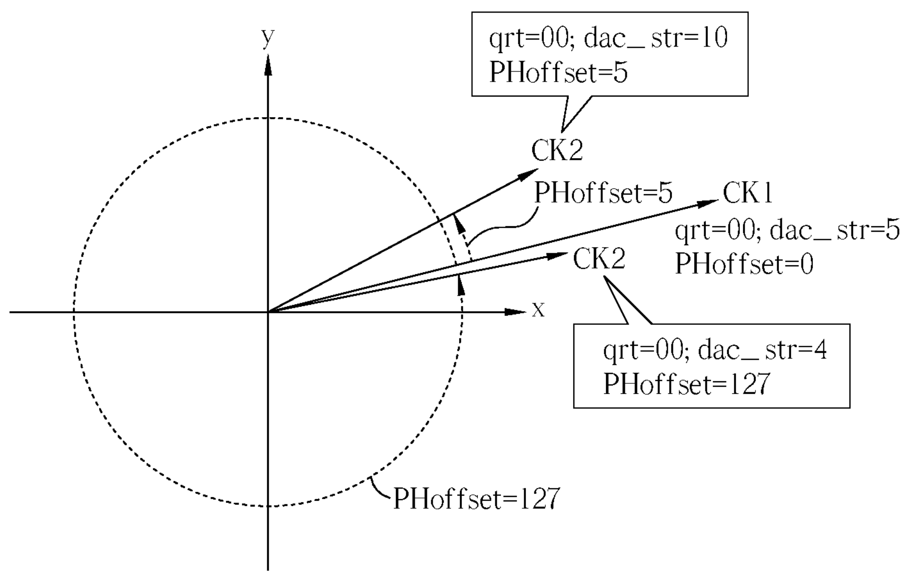
FIG. 3 illustrates an embodiment of phase/timing for the receiver circuit and the eye diagram scan circuit of FIG. 1.

In an embodiment, the phase interpolators 16*a* and 16*b* are matched; the phase interpolator 16*a* provides the timing CK1 in response to the primary phase data PH, and the phase interpolator 16*b* further receives the additionally injected phase offset data PHoffset to provide the timing CK2 in response to a sum of the primary phase data PH and the phase offset data PHoffset, such that the timings CK1 and CK2 are different by a phase difference. Please refer to FIG. 2 and FIG. 3, FIG. 2 illustrates phase information provided by the phase interpolator 16*a*/16*b* to indicate phase of the timing CK1/CK2, and FIG. 3 illustrates phase difference between the timings CK1 and CK2. As shown in FIG. 2, the phase interpolator 16*a*/16*b* can provide two information qrt and dac_str to indicate phase of the timing CK1/CK2; for example, assuming phase of a timing is shown as a vector pointing outward from a origin of an x-y plane, the information qrt indicates which quadrant the phase locates, as four quadrants of the x-y plane are respectively represented by four different values 00, 01, 11 and 10. The information dac_str indicates angle of the phase in each quadrant by a value ranged from 0 to 31. For example, if the information qrt equals 00, when the information dac_str increases from 0 to 31, the angle of the phase measured from the x-axis increases from 0 to 90 degrees. If the information qrt equals 01, when the information dac_str decreases from 31 to 0, the angle of the phase increases from 90 to 180 degrees. Similarly, when the information qrt is kept equal to 11 and the information dac_str increases from 0 to 31, the angle of the phase increases from 180 to 270 degrees, and so on.

In the example of FIG. 3, it is assumed that phase of the timing CK1 is reflected by qrt=00 and dac_str=5. Comparing to phase of the timing CK1, if the phase offset data PHoffset equals 5, then phase of the timing CK2 can be indicated by qrt=00 and dac_str=5+5=10, since the timing CK2 is formed as the phase interpolator 16*b* shifts phase of the timing CK1 by the phase offset data PHoffset. Similarly, if the phase offset data PHoffset equals 127, then phase of the timing CK2 can be indicated by qrt=00 and dac_str=4, wherein value of the information dac_str can be calculated by mod((5+127), 32)=4, and the function mod(y1,y2) returns a residue of dividing y1 by y2.

Figure 4:
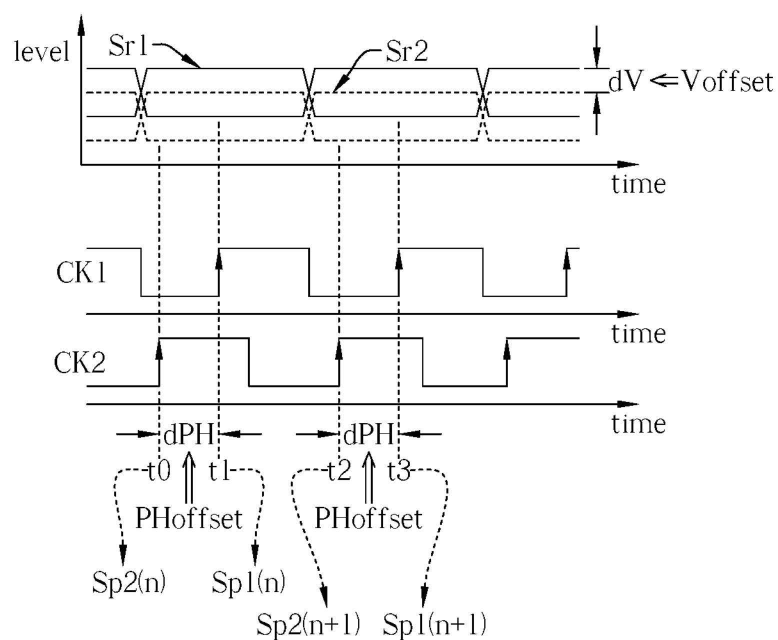
FIG. 4 illustrates an embodiment of waveform and timing for associated signals of the receiver circuit and the eye diagram scan circuit of FIG. 1.

Please refer to FIG. 4 illustrating an embodiment for the de-serializers 14*a* and 14*b* to respectively retrieve the data signal Sp1 and Sp2 from the received signals Sr1 and Sr2 based on the timings CK1 and CK2. As explained in FIG. 3, because the phase interpolator 16*b* further receives the phase offset data PHoffset, phases of the timings CK1 and CK2 are different by a phase different dPH, which is controlled by the phase offset data PHoffset. The phase difference dPH will be reflected by triggering edges (e.g., rising and/or falling edges) of the timings CK1 and CK2, as shown in FIG. 4. For example, a triggering edge of the timing CK1 at time t1 is shifted to a triggering edge of the timing CK2 at time t0 by the phase difference dPH. By changing the phase offset data PHoffset, the phase different dPH follows to change, such that triggering edges of the timing CK2 can lead or lag behind those of the timing CK1.

In response to the triggering edges of the timings CK1 and CK2 at times t1 and t0, the de-serializers 14*a* and 14*b* respective obtain data Sp1(*n*) of N1 bits and data Sp2(*n*) of N2 bits from the received signals Sr1 and Sr2. Similarly, in response to the triggering edges of the timings CK1 and CK2 at times t3 and t2, the de-serializers 14*a* and 14*b* respective obtain data Sp1(*n*+1) of N1 bits and data Sp2(*n*+1) of N2 bits from the received signals Sr1 and Sr2, and so on.

As shown in FIG. 1, the comparison module 28 in the control module 30 is coupled to the data signals Sp1 and Sp2, so as to compare each data Sp1(*n*) of the data signal Sp1 and each data Sp2(*n*) of the data signal Sp2; accordingly, an eye diagram scan result for a given value of the phase offset data PHoffset and a given value of the level offset data Voffset is provided. For example, when the level offset data Voffset and the phase offset data PHoffset remain constant, the control module 30 can perform a number Np of comparisons for Np pairs of data Sp1(*n*) and Sp2(*n*); for each comparison of these Np comparisons, the comparison module 28 compares N3 (e.g., N3=N2) bits selected from the data Sp1(*n*) with corresponding N3 bits selected from the data Sp2(*n*); if the N3 bits match, the corresponding eye diagram scan result is recorded as a successful access, which means that the receiver circuit 20 can correctly retrieve information from the received signal Sr1 even when the received signal Sr1 of the receiver circuit 20 is affected by the voltage difference dV (associated with the level offset data Voffset) and the triggering timing CK1 is affected by the phase difference dPH (associated with the phase offset data PHoffset). On the other hand, for the Np comparisons of Np pairs of N3 bits, if any one comparison finds mismatched bits between a pair of N3 bits, the corresponding eye diagram scan result is recorded as a failed access, which means that the receiver circuit 20 fails to retrieve correct information from the received signal Sr1 owing to the voltage difference dV induced by the level offset data Voffset and the phase difference dPH induced by the phase offset data PHoffset.

Please refer to FIG. 1 again. In an embodiment, the register 32 includes (2*K+1) register units R[0], R[1], . . . , R[k] to R[2*K], each register unit stores an eye diagram scan result. For example, when the level offset data Voffset remains unchanged, the control logic 26 of the control module 30 automatically performs (2*K+1) times of setting and updating of the phase offset data PHoffset, such that the phase offset data PHoffset can induce a phase difference dPH (FIG. 4) of 90*(1−k/K) degrees between the timings CK1 and CK2 during the k-th setting (for k=2*K to 0); that is, the phase difference dPH is step-wisely changed from −90 degrees to +90 degrees at a phase offset separation of (90/K) degrees. Thus, (2*K+1) eye diagram scan results associated with (2*K+1) different values of the phase offset data PHoffset and a same value of the level offset data Voffset can be provided and respectively stored to the register units R[0] to R[2*K]. In an embodiment, each eye diagram scan result indicates a successful access and a failed access respectively by a bit of logic 0 and logic 1, and each register unit R[k] is a register unit of one bit.

After the control module 30 compares and records eye diagram scan results associated with a same level offset data Voffset and (2*K+1) different values of the phase offset data PHoffset, the control module 30 can send a comparison complete signal (not shown), so the level offset data Voffset and the associated eye diagram results in the register 32 can be read (outputted). When contents of the register 32 are completely outputted (and/or no longer needed), the control logic 28 updates value of the level offset data Voffset, such that eye diagram scan result associated with (2*K+1) different values of the phase offset data PHoffset and the updated level offset data Voffset can be provided by comparisons, and then be recorded to the register 32. For example, the control module 30 can receive a read complete signal (not shown) to determine whether contents of the register 32 are read (and/or no longer needed). Similar to relation between the phase offset data PHoffset and the phase difference dPH, changing (updating) the level offset data Voffset also changes the voltage difference dV between the received signals Sr1 and Sr2. By setting the level offset data Voffset, level of the received signal Sr2 can be higher of lower than the received signal Sr1.

Figure 5:
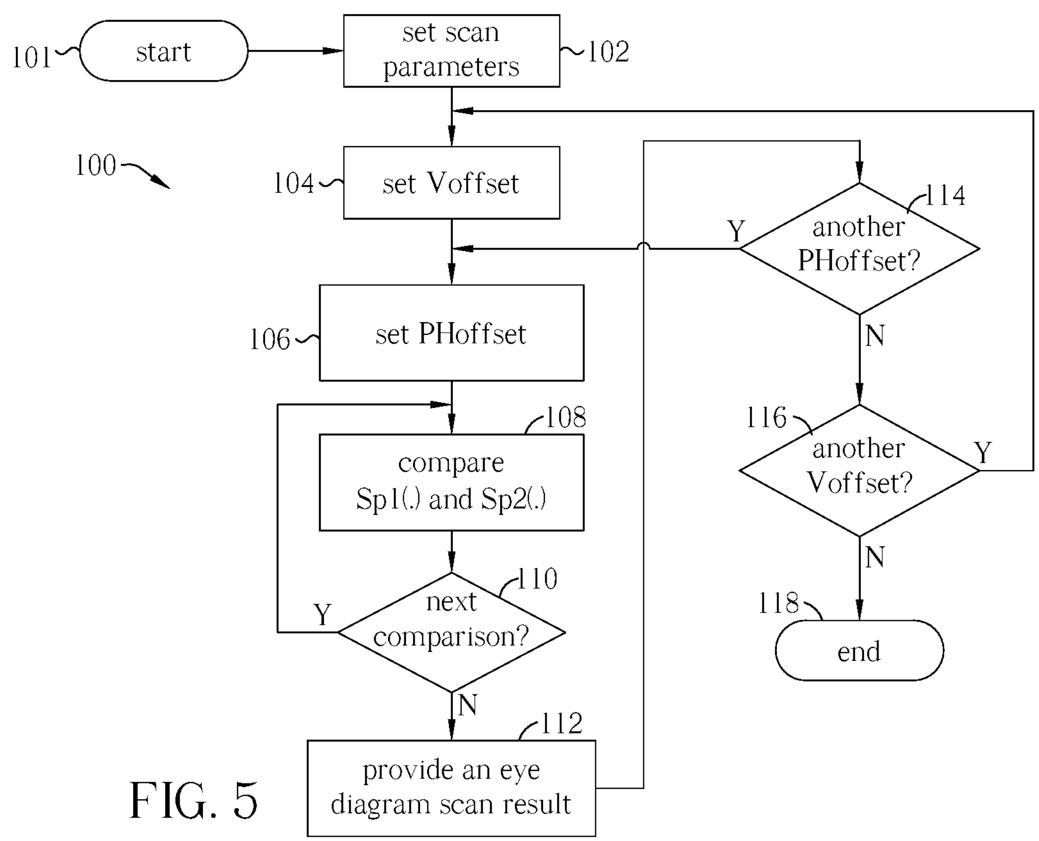
FIG. 5 illustrates a flow according to an embodiment of the invention, which can be applied to the eye diagram scan circuit of FIG. 1.

Please refer to FIG. 5 illustrating a flow 100 according to an embodiment of the invention; eye diagram scanning operation of the eye diagram scan circuit 20 (FIG. 1) can be explained by the flow 100. Main steps of the flow 100 can be described as follows.

Step 101: start to scan the eye diagram. In an embodiment, the control module 30 can receive an enable signal (not shown); when the control module 30 is enabled by the enable signal, the control logic 26 in the control module 30 starts the flow 100, and automatically control progress of the flow 100. On the other hand, if the control module 30 is not enabled, the eye diagram scan circuit 20 can stop functioning.

Step 102: the control module 30 sets parameters of eye diagram scanning according to requirement. As previously described, the control module 30 can performs Np comparisons of Np pairs of data Sp1(*n*) and Sp2(*n*) for a given value of the level offset data Voffset and a given value of the phase offset data PHoffset, so as to provide an associated eye diagram scan result for the given level offset data Voffset and the given phase offset data PHoffset. Therefore, the number Np becomes one parameter of eye diagram scanning, and can be set in step 102. In an embodiment, the control module 30 can receive bit-time setting information and accordingly assign the value of the number Np. As the number Np is set to a greater value, it takes a longer time to obtain an eye diagram scan result for a given level offset data Voffset and a given phase offset data PHoffset; hence the number Np relates to bit-time required to obtain an eye diagram scan result. In other words, eye diagram scan time is adjustable (programmable) according to the invention; it can be set by the bit-time setting information.

Step 104: set the value of the level offset data Voffset.

Step 106: set the value of the phase offset data PHoffset. In an embodiment, after the phase interpolator 16*b* receives the phase offset data PHoffset set by the control logic 26 and induces associated phase difference in the timing CK2, the phase interpolator 16*b* feeds a signal (not shown) back to inform the control logic 26; when the control logic 26 receives the informing feedback of the phase interpolator 16*b*, it directs the flow 100 to step 108.

Step 108: when the level offset data Voffset and the phase offset data PHoffset are kept unchanged, the comparison module 28 compares data Sp1(*n*) and Sp2(*n*) of the data signals Sp1 and Sp2. As previously described, data Sp1(*n*) and Sp2(*n*) are respectively parallel data of N1 bits and N2 bits, and the comparison module 28 compares a pair of N3 bits respectively provided by the data Sp1(*n*) and Sp2(*n*). In an embodiment, if the selected N3 bits of the data Sp1(*n*) and the corresponding N3 bits of the data Sp2(*n*) completely match, the comparison module 28 considers that the data Sp1(*n*) and Sp2(*n*) are matched; on the contrary, if any of the N3 bits of the data Sp1(*n*) does not equal the associated one of the data Sp2(*n*), the comparison module 28 determines that the data Sp1(*n*) and Sp2(*n*) are not matched. In an embodiment, the number N3 can be equal to the number N2 but less than the number N1; for example, the de-serializer 14*b* can extract N2 bits of a certain bit order (e.g., odd bits or even bits) from a parallel data signal of N1 bits to provide the data signal Sp2 of N2 bits and the data Sp2(*n*) of N2 bits; cooperatively, N2 bits of the same bit order can be selected from the data signal Sp1 to be compared with bits of the data Sp2(*n*).

Step 110: if consecutive pair of data Sp1(*n*+1) and Sp2(*n*+1) need to be compared, repeat step 108, otherwise proceed to step 112. For a given level offset data Voffset and a given phase offset data PHoffset, because the control module 30 performs Np comparisons for different Np pairs of data Sp1(*n*) and Sp2(*n*), step 108 is iterated if it has not been repeated Np times. If all Np comparisons are finished, the flow 100 can proceed to step 112.

Step 112: by accumulating results of Np comparisons (step 108), provide an eye diagram scan result associated with the level offset data Voffset set in step 104 and the phase offset data PHoffset set in step 106. For example, if data Sp1(*n*) and Sp2(*n*) match for each of the Np comparisons, the eye diagram scan result is concluded to be a successful access. On the contrary, if any of the Np comparisons reports a mismatch, the eye diagram result is determined to be a failed access. As shown in FIG. 1, each eye diagram scan result obtained in an iteration of step 112 can be recorded to a register unit R[k] of the register 32.

Step 114: during the level offset data Voffset is kept unchanged, if another eye diagram scan result is to be evaluated for a different value of the phase offset data PHoffset, repeat step 106 to update the phase offset data PHoffset by assigning another value to it, and repeat steps 108, 110 and 112. On the contrary, for a same value of the level offset data Voffset, if there is no need to obtain another eye diagram scan result for another value of the phase offset data PHoffset, proceed to step 116. As previously described, when the level offset data Voffset is kept unchanged, the control module 30 provides (2*K+1) eye diagram scan results associated with (2*K+1) different values of the phase offset data PHoffset, wherein the (2*K+1) different values cause the phase difference dPH to be updated from −90 degrees to +90 degrees at a regular phase offset separation (e.g., (90/K) degrees) in an embodiment. Therefore, when the level offset data Voffset is kept at a certain value, if steps 106 to 112 have been repeated (2*K+1) times, the flow 100 can proceed to step 116. In an embodiment, if steps 106 to 112 have been iterated (2*K+1) times, the control nodule 30 issues a comparison complete signal (not shown), such that the eye diagram scan results in the register 32 can be read (outputted).

Step 116: if another group of eye diagram scan results associated with another value of the level offset data Voffset need to be evaluated and the eye diagram scan results stored in the register 32 are no longer needed (e.g., are already read), repeat step 104 to update the level offset data Voffset by setting a new value to it, and then repeat steps 106 to 112 with the level offset data Voffset kept at the updated value. In an embodiment, the eye diagram scan circuit 30 repeats steps 106 to 112 for M different values of the level offset data Voffset, thus step 104 is iterated if steps 106 to 112 have not been repeated M times; if steps 106 to 112 have been repeated M times, the flow 100 proceeds to step 118.

Step 118: end the flow 100 with M*(2*K+1) eye diagram scan results being provided to synthesize an eye diagram. For example, the number M can equal 17, the number K can equal 32, and thus 17*65 eye diagram scan results are utilized to synthesize an eye diagram.

Figure 6:
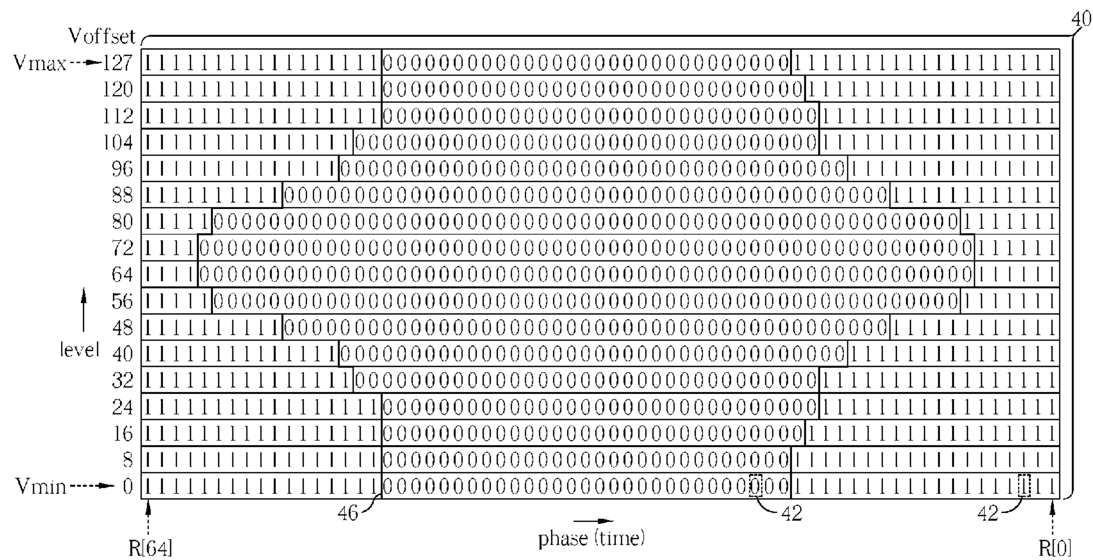
FIG. 6 illustrates an eye diagram according to an embodiment of the invention.

Please refer to FIG. 6 illustrating an eye diagram 40 according to an embodiment of the invention. The eye diagram 40 is synthesized by a plurality of eye diagram scan results 42, each eye diagram scan result 42 indicates a failed access by a logic 1 and a successful access by a logic 0. The horizontal axis of the eye diagram 40 is phase (time) associated with (2*K+1) (e.g., 65) different values of the phase offset data PHoffset; the vertical axis is level associated with M (e.g., 17) different values of the level offset data Voffset. For a same value of the level offset data Voffset, a number (2*K+1) of eye diagram scan results 42 associated with (2*K+1) different values of the phase offset data PHoffset form a horizontal scan line of the eye diagram 40. The (2*K+1) eye diagram scan results 42 of a horizontal scan line can be registered in the register 32 (FIG. 1), and the eye diagram 40 is synthesized by collecting M horizontal scan lines. In an embodiment, the (2*K+1) values of the phase offset data PHoffset are associated with a phase shift (i.e., the phase difference dPH of FIG. 4) ranging from −90 degrees to +90 degrees, and the M different values of the level offset data Voffset are associated with a level shift (the voltage difference dV of FIG. 4) varying from voltages Vmin to Vmax; in an embodiment, the voltage Vmin=(−Vmax).

In the eye diagram 40, the eye diagram scan results 42 which indicate successful access form an eye range 46. According to the eye range 46, whether the receiver circuit 10 (FIG. 1) satisfies specifications of interface standard and whether parameters of the receiver circuit 10 are properly set can be revealed, performance of the receiver circuit 10 can also be evaluated; in addition, the eye range 46 can provide a clue for interface channel equalization.

In the eye diagram scan circuit 20, the control logic 26 can control process of the flow 100 by state machine. The eye diagram scan circuit 20 and the receiver circuit 10 can be integrated into a same chip, which can includes a general-purpose interfacing port, like an $I^2C$ (inter-integrated circuit) port or a JTAG (Joint Test Action Group) port, to support information interchange between the eye diagram scan circuit 20 and an external testing software, such that scanning of eye diagram can be achieved. For example, the testing software can issue an enable signal (step 101 of the flow 100) and bit-time setting information (step 102) to the control module 30 for initiation of the flow 100, so the eye diagram scan circuit 20 can automatically scan a horizontal line of the eye diagram (steps 106 to 112). When the eye diagram scan circuit 20 finishes scanning of a horizontal scan line (step 114), the testing software can receive a comparison complete signal via the interfacing port, and then read the horizontal scan line stored in the register 32 along with the associated value of the level offset data Voffset, so the eye diagram scan circuit 20 can continue to automatically obtain another horizontal scan line associated with another value of the level offset data Voffset. By gathering horizontal scan lines associated with different values of the level offset data Voffset, the testing software synthesizes the eye diagram, e.g., the eye diagram 40 of FIG. 6.

The eye diagram scan circuit 20 can cooperate with an automatic test equipment (ATE, not shown) to scan eye diagram of the receiver circuit 10. The ATE can function as a signal source to provide the signals Rxp and Rxn (FIG. 1), and then obtain the eye diagram scan results in cooperation with the testing software. On the other hand, because the eye diagram scan circuit 20 is a built-in potion of the chip, it can scan eye diagram without the ATE to function as signal source. For example, if the chip includes a transmitter circuit following the same interface standard as the receiver circuit 10, the transmitter circuit can serve as a signal source to provide the signals Rxp and Rxn (or the received signal Sr1), such that the eye diagram scan circuit 20 can scan eye diagram with a loop-back configuration. Moreover, when the chip has been installed on a circuit board and the receiver circuit 10 has been coupled to a transmitter chip, the transmitter chip can serve as a signal source to provide the signals Rxp and Rxn for the eye diagram scan circuit 20 to scan eye diagram.

To sum up, comparing with the prior art, the eye diagram scan technology for receiver circuit according to the invention can provide highly automated eye diagram scanning which greatly reduce required human, software and hardware resources and time. The eye diagram scan circuit of the invention and the receiver circuit are integrated in a same chip, so a phase difference dPH (FIG. 4) exactly reflecting the phase offset data PHoffset can be injected into the timing CK2 against the timing CK1, and thus impact on eye diagram scanning owing to unexpected extra phase offset is prevented; for example, even the timing CK1 suffers jitters of random nature, the timing CK2 will track jitters of the timing CK1, therefore the phase difference between them is exactly controlled by the phase offset data PHoffset. Similarly, the eye diagram scan circuit of the invention can induce a voltage difference dV exactly reflecting the level offset data Voffset into the received signal Sr2 against the received signal Sr1, and impact on eye diagram scanning caused by unexpected voltage offset is thus prevented. The eye diagram scan circuit of the invention also provides flexibility for eye diagram scanning, e.g., programmable bit-time (step 102) of eye diagram scanning. Furthermore, the eye diagram scan circuit of the invention not only can be applied to eye diagram scanning in cooperation with ATE, but also can be applied to eye diagram scanning for mass-produced chips in cooperation with loop-back configuration or anther chip. After de-serialization, because timing (bit rate) of the parallel data signal Sp1/Sp2 is lower than that of the serial received signal Sr1/Sr2, the control module 30 does not have to operate at high-frequency of the serial received signal Sr1/Sr2.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An eye diagram scan circuit for a receiver circuit; said receiver circuit providing a first data signal and a primary phase data in response to a received signal, said primary phase data being associated with a data timing of said first data signal; said eye diagram scan circuit being arranged to provide a plurality of eye diagram scan results for synthesizing an eye diagram, and comprising:

a control module for providing a phase offset data;

a phase interpolator, coupled to said control module and said receiver circuit, for providing an offset timing in response to said phase offset data and said primary phase data; and an access circuit, coupled to said phase interpolator, for providing a second data signal in response to said received signal based on triggering of said offset timing;

wherein said first data signal comprises a plurality of first data, said second data signal comprises a plurality of second data, and said control module further provides a said eye diagram scan result for said phase offset data by comparing said first data signal and said second data signal, including: comparing a predetermined number of said first data and said second data.

2. The eye diagram scan circuit of claim 1, wherein said control module further provides a level offset data, and said eye diagram scan circuit further comprises:

a level adjust circuit, coupled to said received signal and said control module, for adjusting a level of said received signal in response to said level offset data;

wherein said access circuit provides said second data signal in response to said level-adjusted received signal based on triggering of said offset timing, and said control module provides said eye diagram scan result for said phase offset data and said level offset data by comparing said first data signal and said second data signal.

3. The eye diagram scan circuit of claim 2, wherein said control module provides said eye diagram scan result by comparing a predetermined number of said first data and said second data when said level offset data and said phase offset data remain unchanged.

4. The eye diagram scan circuit of claim 3, wherein after said control module provides said eye diagram scan result, said control module further updates said phase offset data while keeping said level offset data unchanged, such that said phase interpolator updates said offset timing in response to said updated phase offset data, and said control module further provides another said eye diagram scan result for said level offset data and said updated phase offset data.

5. The eye diagram scan circuit of claim 4, wherein said control module updates said phase offset data sequentially from a first phase offset value to a second phase offset value at a phase offset separation while keeping said level offset data unchanged; after said control module updates said phase offset data to said second phase offset value and provides a said eye diagram scan result for said updated phase offset data, said control module further updates said level offset data.

6. The eye diagram scan circuit of claim 5, wherein said control module comprises a register for registering multiple said eye diagram scan results for a same value of said level offset data and different values of said phase offset data.

7. The eye diagram scan circuit of claim 6, wherein each said first data comprises a first number of bits, each said second data comprises a second number of bits, and said control module provides said eye diagram scan result by comparing two groups of third number of bits respectively selected from a said first data and a said second data.

8. The eye diagram scan circuit of claim 3, wherein each said first data comprises a first number of bits, each said second data comprises a second number of bits, and said control module provides said eye diagram scan result by comparing two groups of third number of bits respectively selected from a said first data and a said second data.

9. The eye diagram scan circuit of claim 8, wherein said first number is greater than said second number.

10. The eye diagram scan circuit of claim 1, wherein said control module comprises a register for registering multiple said eye diagram scan results respectively for different values of said phase offset data.

11. A method arranged to scan an eye diagram for a receiver circuit; said receiver circuit providing a first data signal and a primary phase data in response to a received signal, said primary phase data being associated with a data timing of said first data signal, and said method comprising:

providing a phase offset data;

providing a level offset data;

providing an offset timing in response to said phase offset data and said primary phase data;

adjusting a level of said received signal in response to said level offset data;

providing a second data signal in response to said level-adjusted received signal based on triggering of said offset timing, wherein said first data signal comprises a plurality of first data, said second data signal comprises a plurality of second data;

providing an eye diagram scan result for said phase offset data and said level offset data by comparing said first data signal and said second data signal, including comparing a predetermined number of said first data and said second data when said level offset data and said phase offset data remain unchanged.

12. The method of claim 11 further comprising:

after providing said eye diagram scan result, updating said phase offset data while keeping said level offset data unchanged; and updating said offset timing in response to said updated phase offset data, and providing another said eye diagram scan result for said level offset data and said updated phase offset data.

13. The method of claim 12 further comprising:

while keeping said level offset data unchanged, updating said phase offset data sequentially from a first phase offset value to a second phase offset value at a phase offset separation; and after updating said phase offset data to said second phase offset value and providing a said eye diagram scan result for said updated phase offset data, updating said level offset data.

14. The method of claim 13 further comprising:

registering multiple said eye diagram scan results to a register for a same value of said level offset data and different values of said phase offset data.

15. The method of claim 11, wherein each said first data comprises a first number of bits, each said second data comprises a second number of bits, and said method further comprises:

providing said eye diagram scan result by comparing two groups of third number of bits respectively selected from a said first data and a said second data.

16. The method of claim 15, wherein said first number is greater than said second number.

* * * * *